United States Patent
Ikeda

(10) Patent No.: US 6,327,751 B1
(45) Date of Patent: Dec. 11, 2001

(54) CODE HOLDING BUCKLE

(75) Inventor: Yasuhiko Ikeda, Toyonaka (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 09/547,701

(22) Filed: Apr. 11, 2000

(30) Foreign Application Priority Data

Apr. 26, 1999 (JP) .................................. 11-117737

(51) Int. Cl.[7] ........................................ F16G 11/00
(52) U.S. Cl. .................. 24/115 G; 24/3.13; 24/136 R; 24/136 L
(58) Field of Search ................ 24/115 G, 115 M, 24/136 R, 136 L, 625, 3.13

(56) References Cited

U.S. PATENT DOCUMENTS

| 2,307,808 | * | 1/1943 | Segal | ........................... 24/3.13 |
| 4,112,551 | * | 9/1978 | Chapman | ........................... 24/625 |
| 4,506,417 | * | 3/1985 | Hara | ........................... 24/115 G |
| 5,649,340 | * | 7/1997 | Ida | ........................... 24/136 R |
| 5,737,808 | * | 4/1998 | Ikeda | ........................... 24/136 L |

FOREIGN PATENT DOCUMENTS

| 5-3052 | 1/1993 | (JP) | |
| 5-3053 | 1/1993 | (JP) | |
| 8-158282 | 6/1996 | (JP) | |
| 9-289906 | 11/1997 | (JP) | |
| 11-99008 | 4/1999 | (JP) | |
| 11-196910 | 7/1999 | (JP) | |

* cited by examiner

Primary Examiner—Victor N. Sakran
(74) Attorney, Agent, or Firm—Kanesaka & Takeuchi

(57) ABSTRACT

A cord holding buckle is formed of a cord holding device, and an end stopper to be attached to an end of a cord. The cord holding device includes a body portion, a through-hole formed in the body portion for allowing the cord to pass therethrough, a fixing member for fixing the cord relative to the body portion, and a first coupler attached to the body portion. The end stopper includes a second coupler detachably attached to the first coupler, so that the end stopper can be detachably fixed to the cord holding device.

6 Claims, 9 Drawing Sheets

CODE HOLDING BUCKLE

BACKGROUND OF THE INVENTION AND RELATED ART STATEMENT

The present invention relates to a cord holding or stopping buckle formed of a cord holding component and an end stopper as one set for adjusting the pulled-out length and tightness of a belt, string, cord, or rope (all hereafter referred to as a cord in this document) which is used in, for example, clothing, bag, and so on. The cord holding component has an adjustment function, and the end stopper has a function of preventing the cord from being pulled out unexpectedly.

FIGS. 10(a)–10(c) illustrate an example of the use condition of conventional cord holding or stopping components. The cord holding components 45 in FIG. 10(a) are installed at the neck area and waist area of a clothing 40, as shown in FIG. 10(a), and attached to both sides of the extending parts 41a of the cord 41 extending from holes 40a. The cord holding components 45 adjust the tightness of the cord 41, namely, they adjust the length of the extending parts 41a arbitrarily, and stop the cords against the force pulling the extending parts 41a toward the clothing again after the adjustment.

As the structure, the cord holding component is composed of, for example, a cylindrical body 46 having a bottom and through-holes 46a, and a locking member 47 with a through-hole, a part of which is inserted into the body 46 to be movable in and out of the body, and is urged outwardly by a spring installed separately or integrally. When the locking member 47 is pushed into the body 46 against the spring force and the through holes of both the body 46 and the locking member 47 are aligned, an end of the cord 41 is passed through the through-hole (cord free position). When the pushing force is released, the locking member 47 is in the position of partially protruding out of the body due to the spring force, and the shift in the relative position of the through-hole on the locking member 47 with respect to the through-hole 46a on the body 46 stops the cord 41 with the proper tension (cord stop position).

In the aforementioned cord stop component 45, the stopping force for the extending part 41a may be increased in proportion to the spring force pressing the locking member 47 outward. However, if the stopping force is set too strongly by increasing the spring force, it requires a strong force in switching to the cord free position by pushing the locking member 47, and it would not be easy to use. Conventionally, the extending part 41a from the through-hole 46a on the cord holding component 45 has a knot 41c at its free end side, as shown in FIG. 10(b), or the end stopper 48 at its free end side, as shown in FIG. 10(c), so that the knot 41c or the end stopper 48 prevents the extending part 41a from slipping out of the cord holding component 45 unexpectedly even though the extending part 41a is strongly pulled back through the cord holding component. This end stopper 48 has a cylindrical shape with a bottom, having a hole 48a on one end side. The extending part 41a is attached to the end stopper by inserting the free end of the extending part into the cylinder through the hole 48a and making a larger diameter part on the free end by knotting or a metal fixture.

In the aforementioned conventional structure, without the knot 41c or end stopper 48, the cord holding component 45 would have the problem that it would unexpectedly slip out of the cord 41, and performance would be unsatisfactory. When the knot 41c is made or the end stopper 48 is attached at the free end of the extending part 41a, a new problem occurs. That is, the extending part 41a extends according to the tightness of the cord 41, and then the knot 41c or end stopper 48 swings like a pendulum from the cord holding component 45. This makes a user uneasy. This problem not only makes a user uneasy, but also causes the problems such as hitting a face of a user when the length of the extending part 41a is longer than about 10 cm at which time the knot 41c or stopper 48 swings a lot as the user moves. Although the conventional end stopper 48 is apparently preferable rather than the knot 41c, it requires a knot or a larger diameter cord end to prevent the end stopper from falling off after inserting the free end of the extending part 41a into the stopper cylinder through the hole 48a. Thus, a handling or workability is poor.

The present invention has been made in order to overcome the aforementioned problems when the cord holding component and end stopper are used as a set, and an object of the invention is to provide a cord holding buckle, wherein a cord extending part and an end stopper do not become cumbersome even when the cord extending part is extended largely by pulling out of the cord stop component, and which is easy to use and looks nice.

Another object of the invention is to provide a cord holding buckle as stated above, wherein the structure of the end stopper is improved to have good handling and working ability when it is attached to the free end of the cord extending part.

A further object of the invention is to provide a cord holding buckle as stated above, which make it easier to provide an end stopper flat and of small size.

Other objects and advantages of the invention will be apparent from the following description of the invention.

SUMMARY OF THE INVENTION

In order to achieve the objects as described above, the cord holding buckle of the present invention has a cord holding component and an end stopper. The cord holding component has through-holes on its body, through which a cord extends from an entrance opening to an exit opening, and can stop the cord against the pulling force. The end stopper is attached to the free end of the cord extending outside of the exit opening, and can prevent the cord from being unexpectedly pulled out of the through-holes. The cord holding component and the end stopper have a female coupler and a male coupler, respectively, by which both are connected as an attachable/detachable couple.

The cord holding buckle is composed of a set of one cord holding component and one end stopper. When the cord extending part which is pulled out of the cord holding component is long, the end stopper is connected to the cord holding component by joining the female and male couplers. The female and male couplers are usually built in the body of the cord holding component and the corresponding outer side of the end stopper, respectively. The male coupler of the end stopper, for example, is connected to the female coupler of the cord holding component.

In this joined condition, the cord extending part pulled out of the cord holding component makes a loop between the through-hole of the cord holding component and the end stopper connected to the cord holding component, and therefore the length of the loop is only about half of the cord extending part itself, which effectively prevents the cord extending part and the end stopper from swinging. That is, the present invention provides a reasonable resolution of the troubles conventionally caused by the cord extending part and the end stopper which makes a user uneasy, becomes cumbersome, or hits a user's face. Furthermore, the cord extending part is shortened to the half length by making a loop when the end stopper is joined to the cord holding component contributing to an improvement in the external appearance of the cord holding device. The present invention intends to create an attachable/detachable couple of the cord holding component and the end stopper by designing them as one set in contrast to the conventional technique where a cord holding component and an end stopper have been designed separately, and to provide a one-piece-like appearance when they are in use.

It is preferable to form the present invention as follows.

First, the end stopper is formed of a pair of half-snap bodies which are folded at a hinge part, interlocked with each other for receiving and biting the free end of the cord between the pair of the half-snap bodies, and become one piece as a joined snap body. In this structure, the end stopper can be attached to the cord very easily by joining the half-snap bodies one over the other after placing the free end of the cord extending outside of the exit opening of the cord holding component between the two half-snap bodies. Therefore, the workability of the end stopper in handling the cord is excellent and it is also easy to make the end stopper in a flat and simple shape because of the structure of the pair of the half-snap bodies. The treatment of the cord end can be simplified because the free end of the cord is just needed to be inserted between the pair of the half-snap bodies.

Secondly, the end stopper is composed of a pair of half-snap bodies, each of which has a joining part, i.e. a female or male coupler, corresponding to the male or female coupler of the cord holding component body, and either side of which can be connected to the holding component body. This structure allows either side of the half-snap bodies to be connected to the cord holding component body, and therefore, a user can choose a convenient side depending on the direction of the cord extending from the exit opening of the cord holding component.

DETAILED DESCRIPTION OF PREFERRED EMBODIMENTS

The embodiments of the present invention are explained with reference to the drawings below. These embodiments represent suitable forms of this invention but do not limit the technical range of the present invention.

Figure 1A:
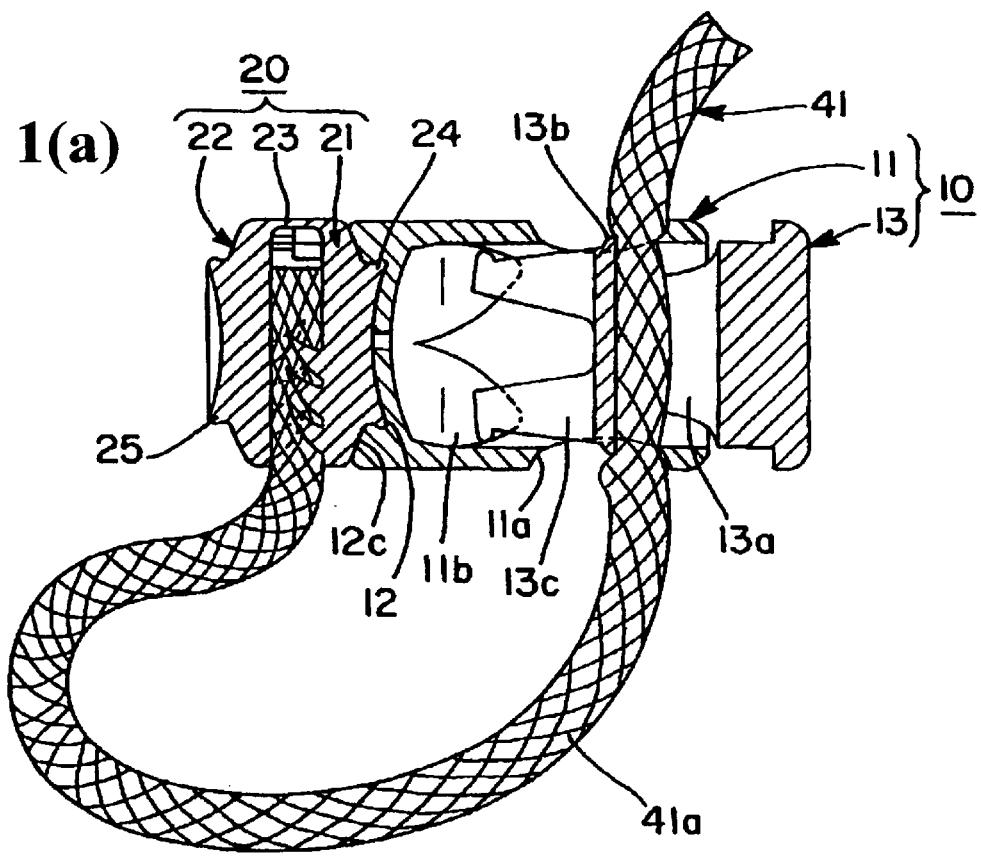
FIG. 1(a) is a sectional view of a cord holding buckle in use according to a first embodiment of the present invention.
Figure 1B:
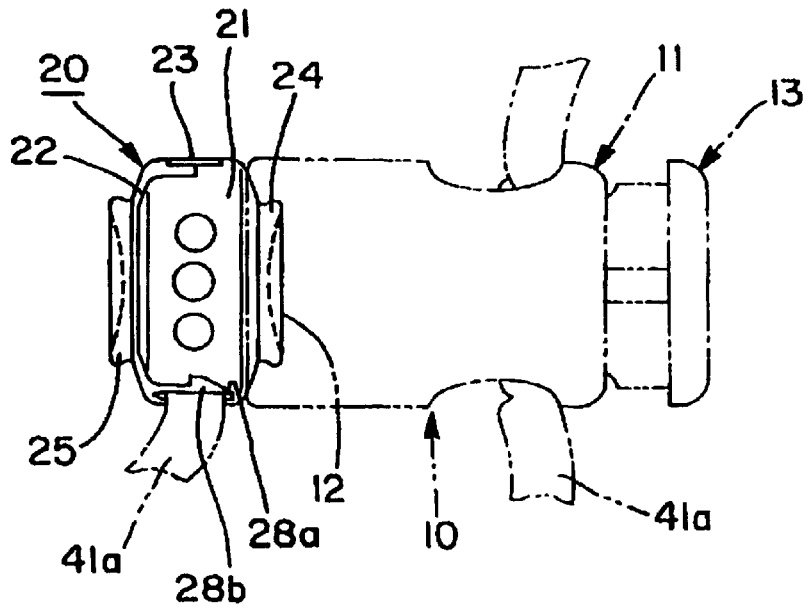
FIG. 1(b) is a side view of an end stopper.
Figure 2A:
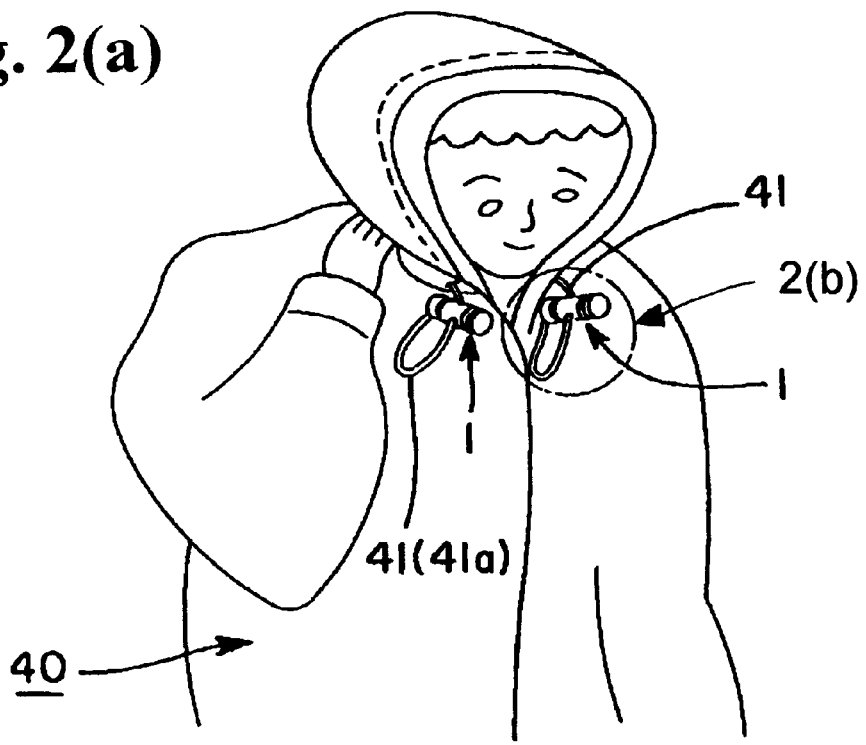
FIG. 2(a) is a whole view in using the cord holding buckle.
Figure 2B:
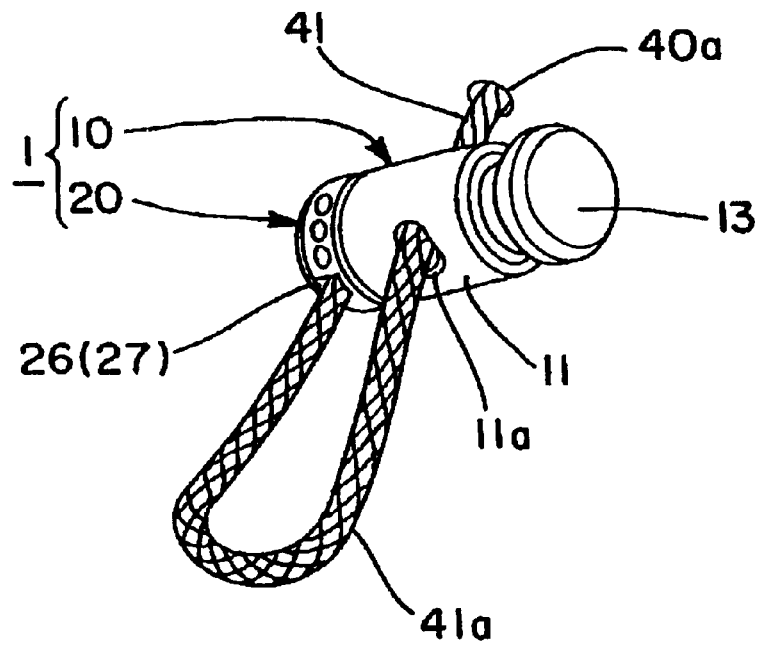
FIG. 2(b) is an enlarged perspective view of the cord holding buckle.
Figure 3A:
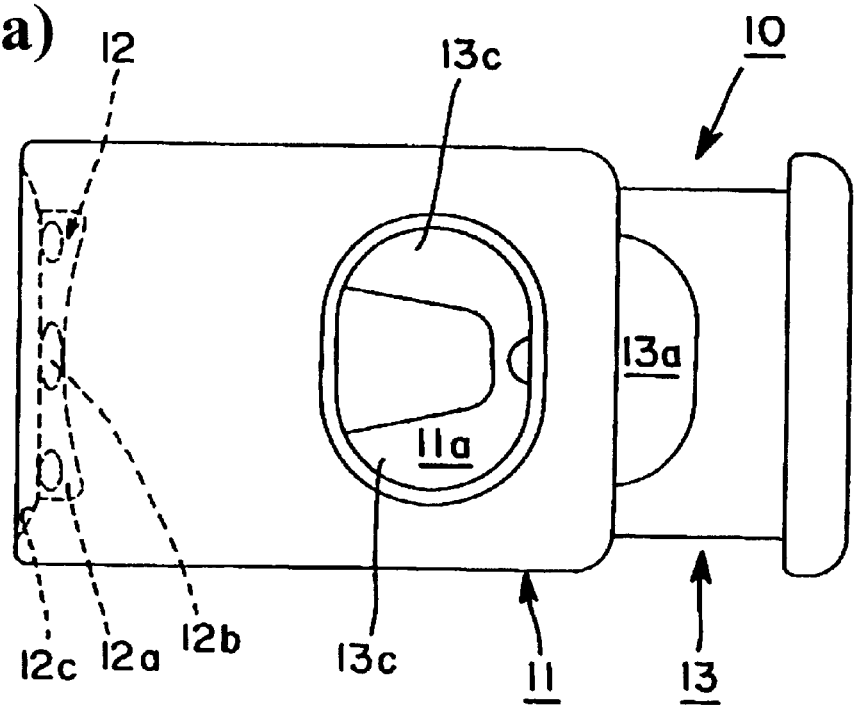
FIG. 3(a) is a detailed view of a cord holding component for forming the buckle of the present invention.
Figure 3B:
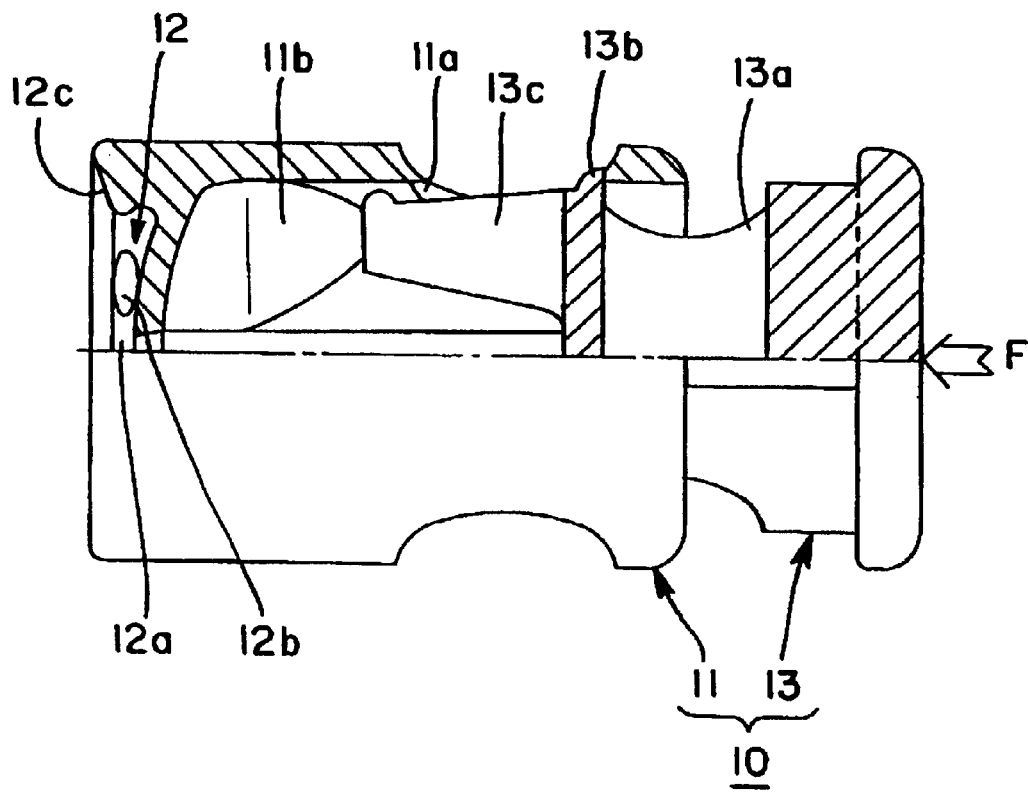
FIG. 3(b) is a side view of the cord holding component wherein a half of the cord holding component is sectioned.
Figure 4:
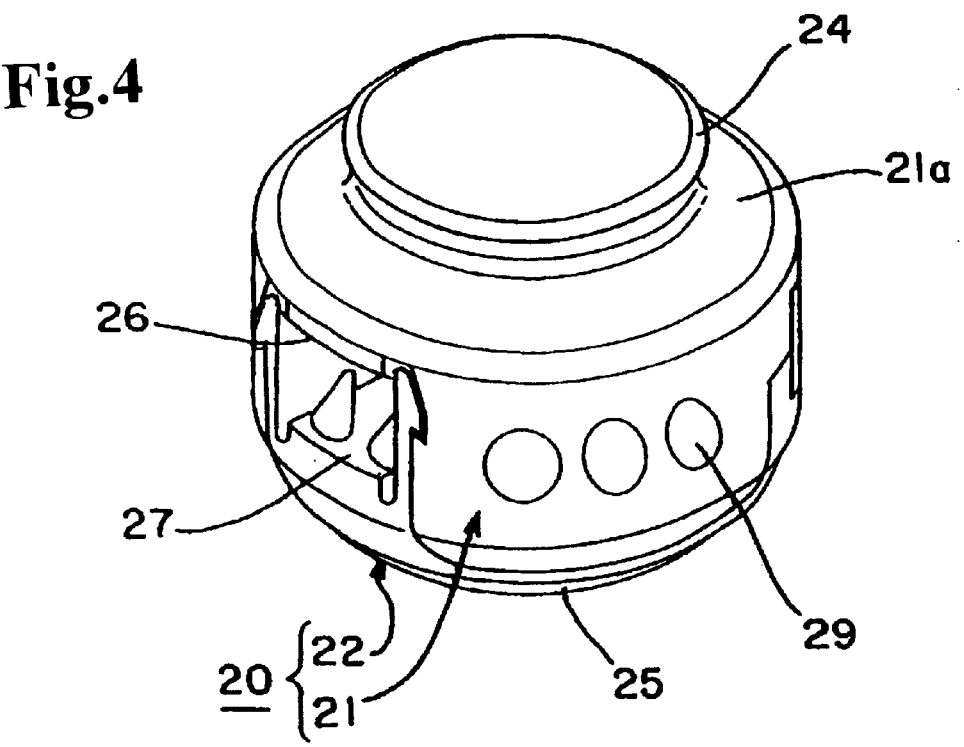
FIG. 4 is a perspective view of the end stopper forming the cord holding buckle of the first embodiment of the present invention.
Figure 5:
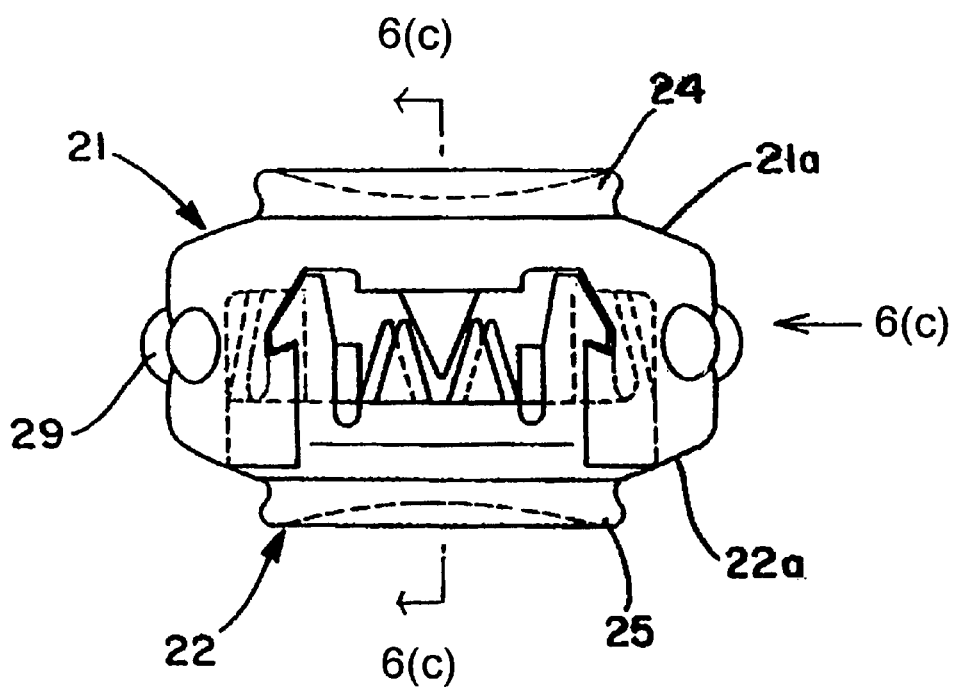
FIG. 5 is a front view of the end stopper of the first embodiment of the present invention.
Figure 6A:
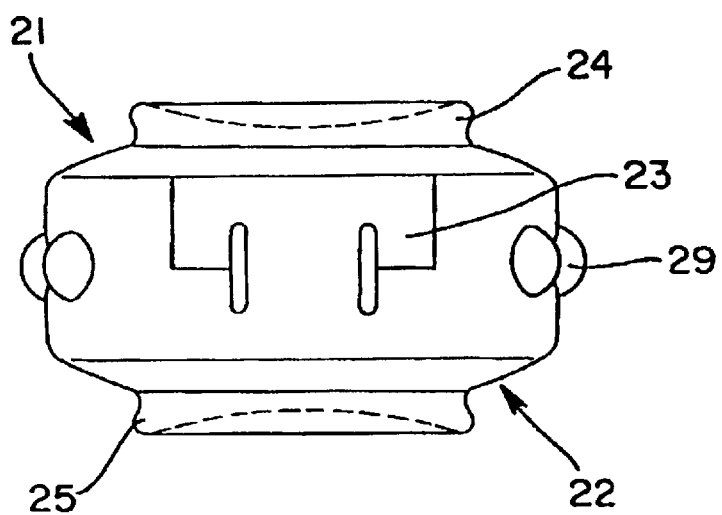
FIG. 6(a) is a rear view of the end stopper of the first embodiment of the present invention.
Figure 6B:
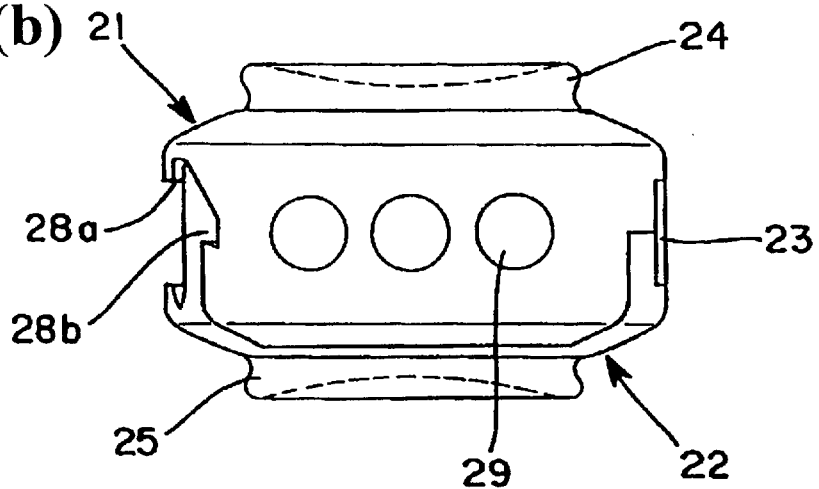
FIG. 6(b) is a side view from an arrow 6(b) in FIG. 5.
Figure 6C:
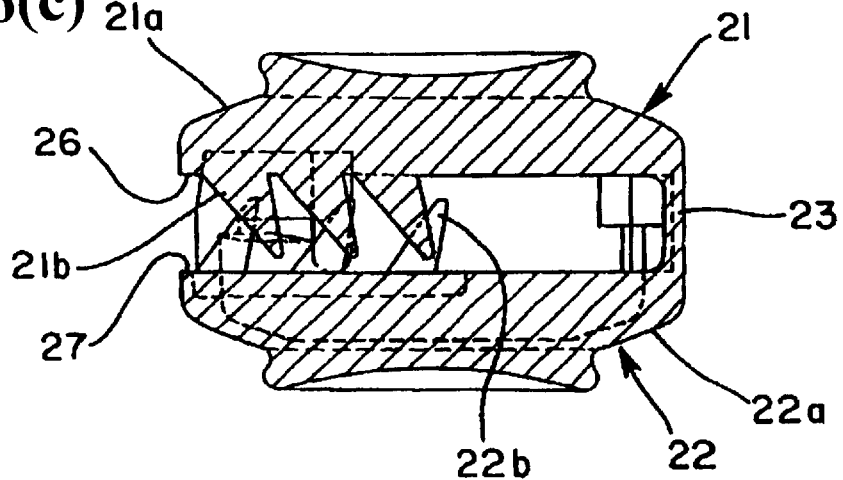
FIG. 6(c) is a sectional view taken along line 6(c)—6(c) in FIG. 5.
Figure 7A:
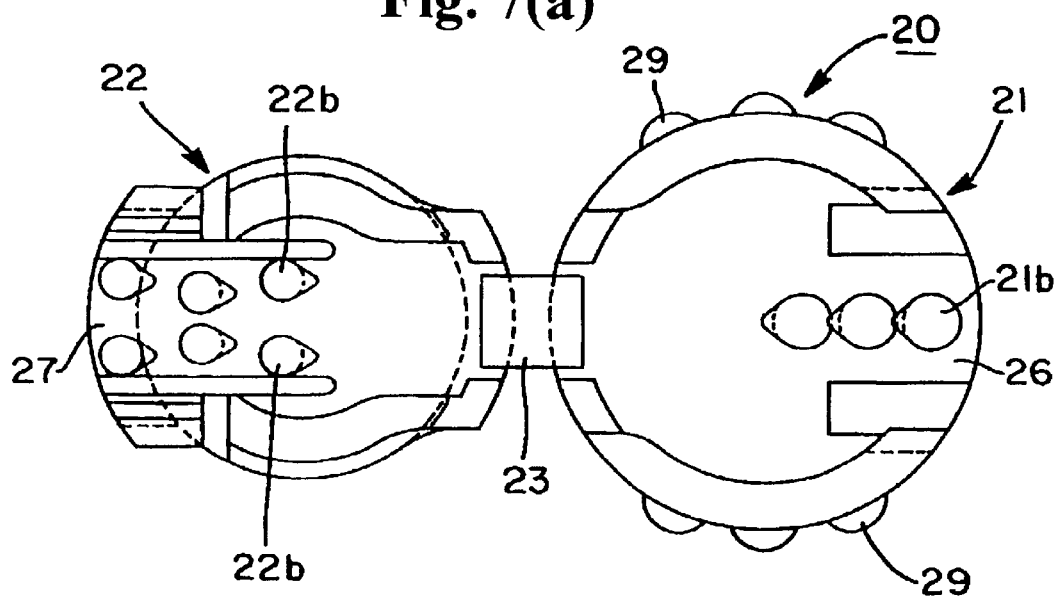
FIG. 7(a) is a plan view of the end stopper in a pre-used condition of the first embodiment of the present invention.
Figure 7B:
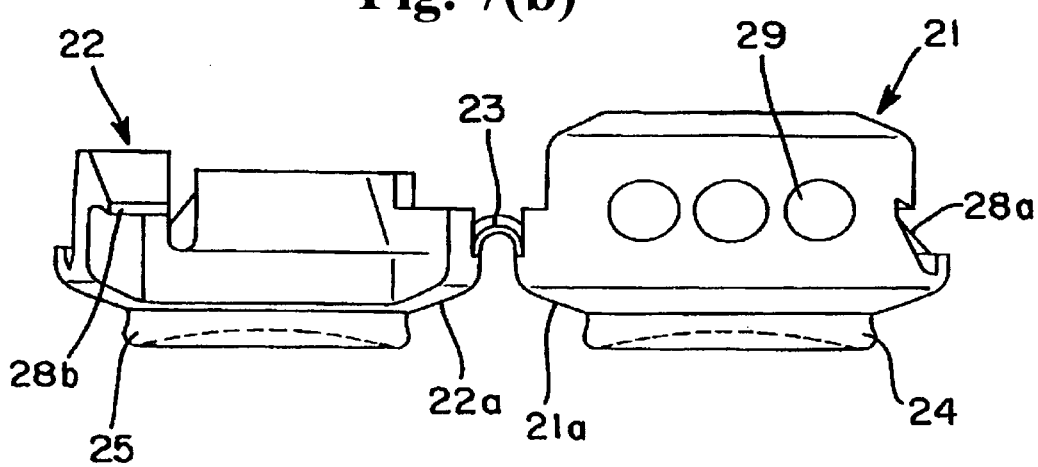
FIG. 7(b) is a side view of FIG. 7(a)
Figure 7C:
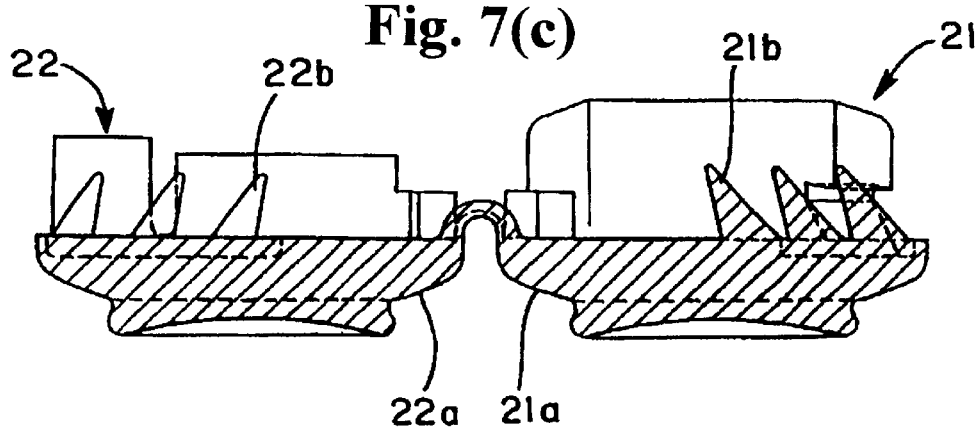
FIG. 7(c) is a sectional view of FIG. 7(a)

FIG. 1(a) through FIG. 7(c) show the first embodiment of the cord holding buckle. FIG. 1(a) is an enlarged sectional view of the cord stop buckle in use shown in FIG. 2(b), and FIG. 1(b) is a side view of an end stopper. FIG. 2(a) is an explanatory view of the cord holding buckle of the invention applied to clothing, and FIG. 2(b) is a perspective view of the cord holding buckle. FIG. 3(a) is a plan view of a cord holding component without a cord, and FIG. 3(b) is a half sectional view of the cord holding component. FIG. 4 is a perspective view of an end stopper. FIG. 5 is a front view of the end stopper. FIG. 6(a) is a rear view of the end stopper, FIG. 6(b) is a side view seen from the direction of arrow 6(b) in FIG. 5, and FIG. 6(c) is a sectional view taken along line 6(c)—6(c) in FIG. 5. FIGS. 7(a), 7(b) and 7(c) are a plan view, a side view and a sectional view in the pre-used form of the end stopper, respectively.

The cord holding buckle 1 of the first embodiment is composed of an attachable/detachable cord holding component 10 and an end stopper 20. Both are made from resin molding but other materials may be used. The size in the drawing is enlarged, but the actual size is small. The actual size of the cord holding buckle used for usual clothing cords is, for example, about 20 to 40 mm in length for the cord holding component 10, and about 15 to 25 mm in outer diameter and 6 to 15 mm in thickness for the end stopper.

The cord holding components 10, as shown in FIG. 2(a), are placed near the neck area of clothing 40, and are attached to both sides of cord extending parts 41a of a cord 41 extending from holes 40a in the clothing to adjust the length of the extending parts 41a freely and to fix the length of the extending parts 41a after adjustment by stopping the cord against the pulling force toward the clothing side. Such a fundamental function is the same as the existing one, but the cord holding component 10 of the present invention is different from the conventional product because it is designed to form a pair with the end stopper 20, and is connected to the end stopper 20.

The cord holding component 10, as shown in FIGS. 3(a) and 3(b), is composed of a component body 11 and a locking member 13. The component body 11 has a cylindrical shape with a bottom, and includes integrally through-holes 11a passing through laterally, tapered parts 11b which extend toward the bottom of the cylinder from the lower part of the through-holes 11a in the cylinder, and a concave part 12 formed at the outside of the cylinder bottom as a female coupler. The through-holes 11a are holes to enable the insertion of the cord 41. There are four tapered parts 11b matching leg-type spring parts 13c of the locking member 13 inside the cylinder. The concave part 12 is a portion which receives a part of the end stopper 20 (male coupler axial parts 24, 25 to be described later) and is composed of a receiving part 12a curving outward on the concave bottom, a plurality of small protrusions 12b projecting inside the receiving part 12a, and a tapered lower part 12c which increases the opening outward from the end of the receiving part 12a. The locking member 13 has a through-hole 13a corresponding to the through-holes 11a, a blade-like controlling part 13b projecting outward which is located under the through-hole 13a and within the through-holes 11a of the component body 11, and four leg-like spring parts 13c protruding from the end side of the controlling part 13b.

Usually, the locking member 13, as shown in FIGS. 3(a) and 3(b), is partially forced out of the component body 11 by the mechanism of the tapered part 11b and the leg-like spring parts 13c. In this condition, the controlling part 13b prevents the locking member 13 from slipping out of the component body 11 by engaging the top edges of the through-holes 11a of the component body 11. In relation to the cord, the locking member 13 is pressed into the component body 11 by the force F in FIG. 3(b) against the spring force of the leg-like spring parts 13c, and then, both of the through-holes 11a of the component body 11 and the through-holes 13a of the locking member 13 are lined up. The extending part 41a of the cord 41 is inserted and passed through both of the lined-up through-holes 11a and 13a (cord free position). Then, after the force on the locking member 13 is released, the locking member 13 returns to the partially forced-out position by the leg-like spring parts 13c. At this stage, the relative position of the through-hole 13a of the locking member 13 to the through-holes 11a of the component body 11 shifts, and the cord 41 is stopped by a certain tension (cord stop position), As shown in FIGS. 1(a), 1(b) and FIGS. 7(a)–7(c), the end stopper 20 is composed of a pair of half-snap bodies 21, 22 connected by a thin plate-like hinge part 23, between which the corresponding edge of the cord 41 can be clasped. As shown in FIGS. 7(a)–7(c), both the half-snap bodies 21, 22 have an almost cylindrical shape with different sizes. The half-snap body 22 is put on the somewhat larger half-snap body 21. The outside surfaces of the half-snap bodies are shaped to have curved surfaces 21a, 22a, in the center of which coupler axial parts 24, 25 are formed as protrusions. Each of the coupler axial parts 24, 25 has a dish-like shape with a somewhat smaller base in diameter, and can be connected to the receiving part 12a in the concave part 12 of the component body 11 through the small protrusions 12b elastically and attachably/detachably. Once the half-snap body is connected to the component body, the outside curved surface 21a or 22a of the half-snap body 21 or 22 makes close contact with the tapered part 12c and the area of the half-snap body 21 or 22 connected to the concave part 12 of the component body 11 appears to be one piece. In FIGS. 1(a), 1(b) and FIGS. 2(a), 2(b), the half-snap body 21 is connected to the component body 11, but instead the other half-snap body 22 may be connected to the component body 11.

As shown in FIG. 4 through FIG. 7(c), both half-snap bodies 21, 22 have openings 26, 27 cut out partially at cylindrical parts on the opposite side of the hinge part 23, a plurality of claws 21b, 22b protruding inside, and a fastener insert part 28a and a fastener socket part 28b for fastening and unfastening the snap bodies. The sizes of the openings 26, 27 are large enough to insert the free end of the cord 41 through a window created by these openings. As shown in FIGS. 7(a)–7(c), the claws 21b are located on the side of the opening 26 along the central line of the half-snap body 21. The claws 22b are located on the side of the opening 27 along both sides of the central line of the half-snap body 22. The fastener insert part 28a is formed on the wall side where the opening 26 of the half-snap body 21 is defined, and the fastener socket part 28b is made on the wall side where the opening 27 of the half-snap body 22 is defined. A plurality of semi-spherical protrusions 29 is formed on the outer surface of the half-snap body 21 for decoration and structural reinforcement.

The end stoppers 20, as shown in FIGS. 2(a), 2(b), are attached to both ends of the cord 41 which is used for tightening an open area of clothing 40 (it may be applied to bags, knapsacks, or other articles that can be tightened with a cord) together with the cord holding component 10. The cord 41 is drawn from the holes 40a made in the clothing 40. After the cord holding component 10 is attached to the cord extending part 41a, the end stopper 20 is attached. Namely, the cord holding component 10 is attached to the extending part 41a of the cord 41 as explained before. In attaching the end stopper 20, both half-snap bodies 21, 22 are folded at the hinge part 23 and firmly pressed together after the free end of the extending part 41a is inserted into the openings 26, 27. Both half-snap bodies 21, 22 form the final product shape of the end stopper 20 through the connection between the fastener insert part 28a and the fastener socket part 28b, and at the same time, the claws 21b, 22b bite the free end of the cord extending part 41a from the top and bottom. The end stopper 20 has now been attached to the free end of the cord extending part 41a by the biting of these claws 21b, 22b.

The cord holding component 10 and the end stopper 20 attached to the extending part 41a of the cord 41 as described above are next connected to each other by, for example, holding the cord holding component with one hand and picking up the end stopper 20 with the other hand and pushing the coupler axial part 24 or 25 into the concave part 12 of the cord holding component 10. In the connected state, as shown in the enlarged drawing of FIG. 2(b), the extending part 41a of the cord 41 drawn out of the cord holding component makes a loop between the through-hole 11a of the body 11 of the cord holding component 10 and the openings 26, 27 of the end stopper 20 connected to the body 11. Since the length of the loop by the extending part 41a of the cord 41 is half the length of the extending part itself, this structure can prevent the extending part 41a and the end stopper 20 from swinging.

Figure 8:
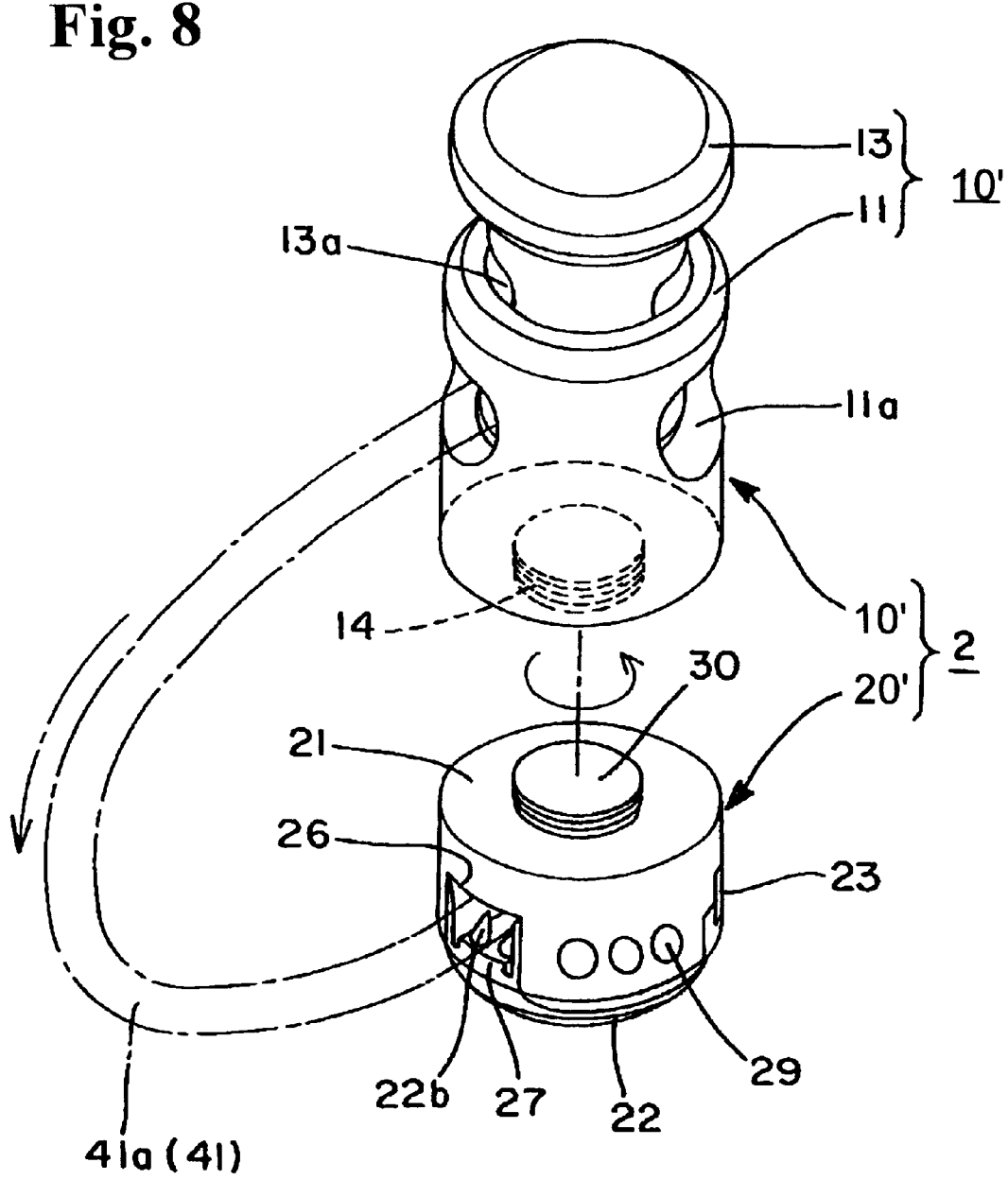
FIG. 8 is a perspective view of the cord holding buckle of a second embodiment of the present invention.
Figure 9:
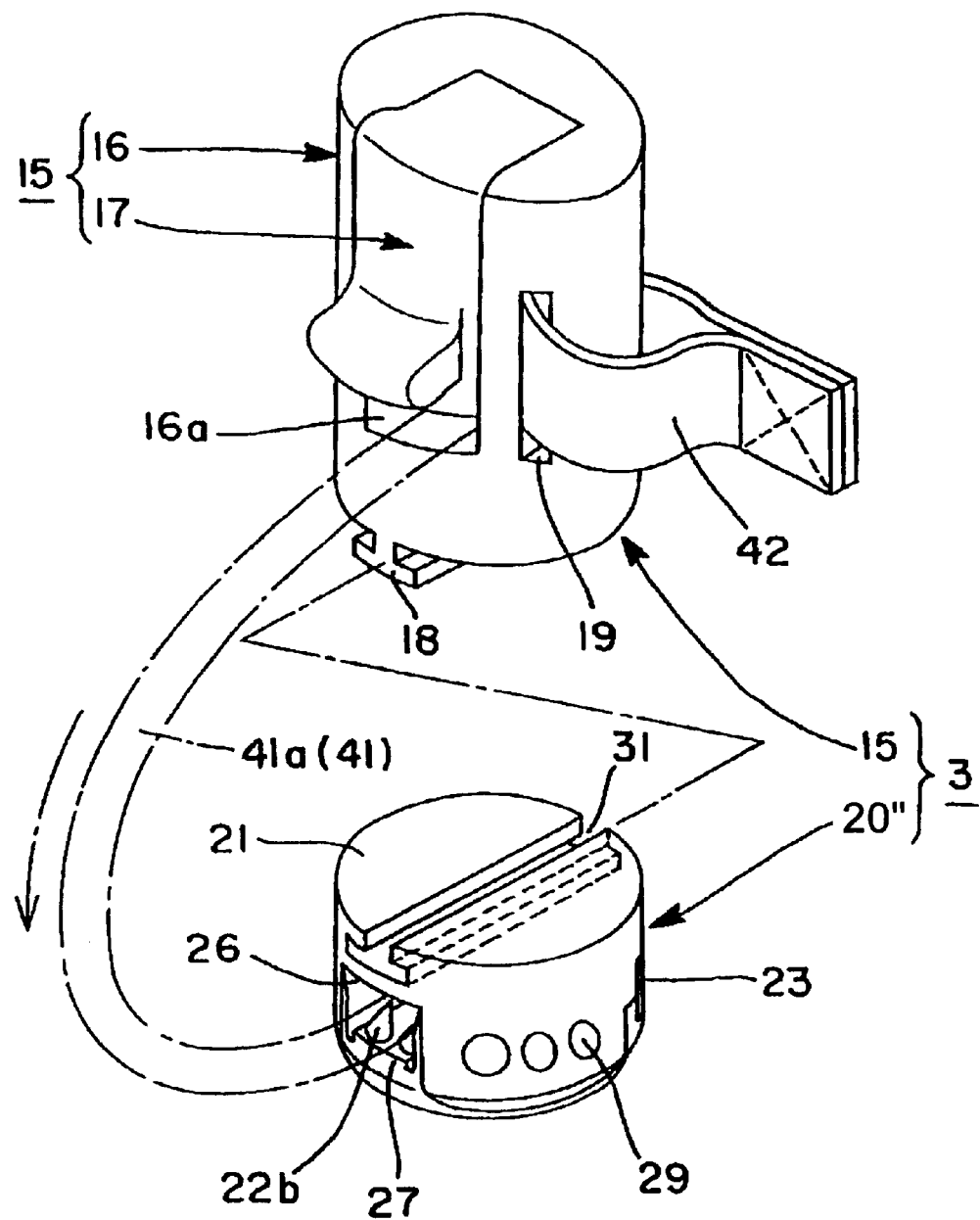
FIG. 9 is a perspective view of the cord holding buckle of a third embodiment of the present invention.
Figure 10A:
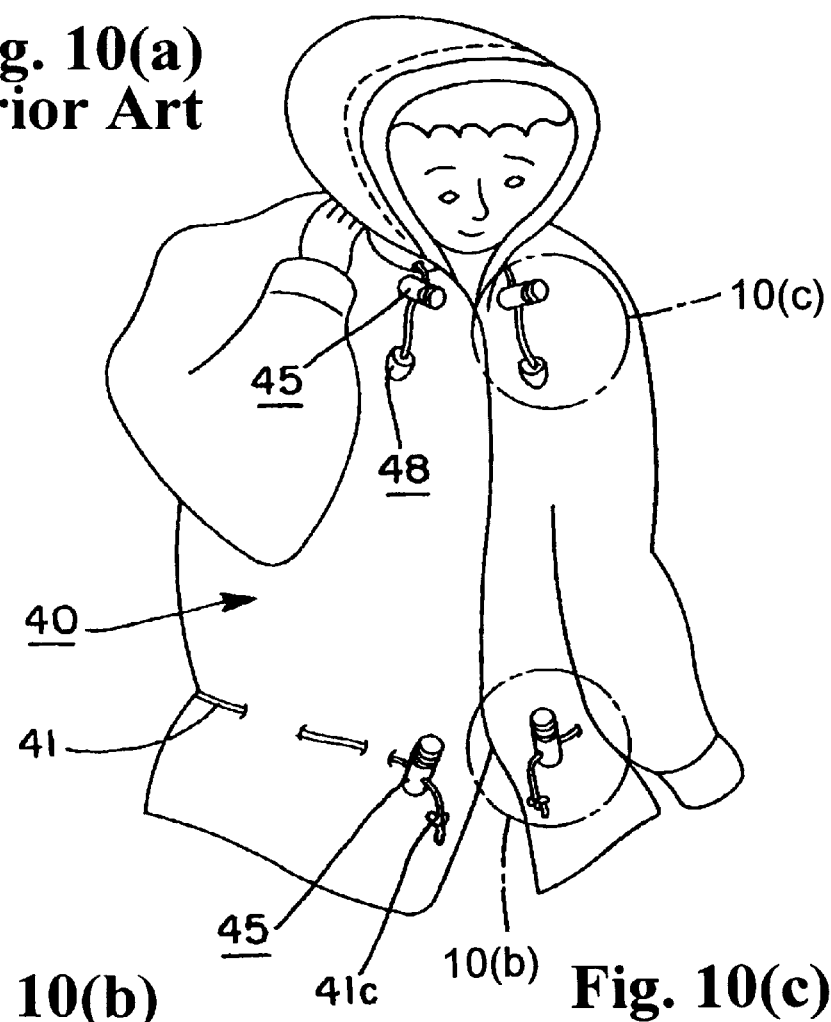
FIG. 10(a) is an explanatory view for illustrating using conditions of conventional cord holding devices.
Figure 10B:
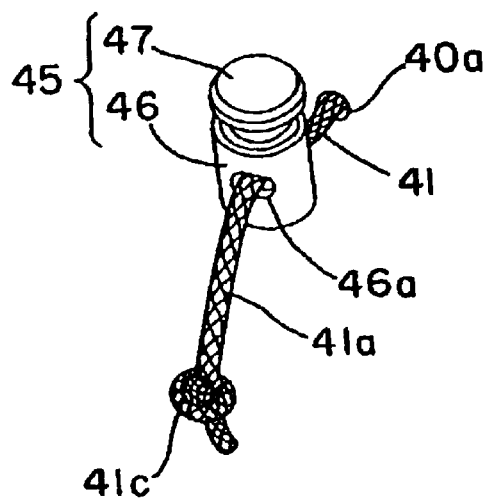
FIG. 10(b) is a perspective view of a part 10(b) in FIG. 10(a)
Figure 10C:
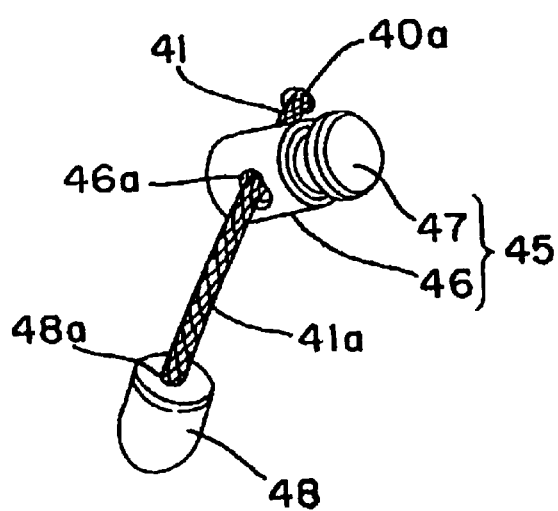
FIG. 10(c) is a perspective view of a part 10(c) in FIG. 10(a).

FIG. 8 and FIG. 9 show cord holding buckles of the second and third embodiments. These cord holding buckles 2, 3 are composed of a cord holding component 10' or 15, and an end stopper 20' or 20" similar to the first embodiment described above. Therefore, only modified portions will be explained below by using the same numbers on the same parts and locations.

The cord holding buckle 2 of FIG. 8 is composed of a cord holding component 10' which is formed of a body 11, and a locking member 13 inserted into the body 11 and partially protruding from the body 11 because it is being pressed out by the spring force as in the first embodiment. The body 11 has a female threaded hole 14 on its bottom side. The end stopper 20' has a threaded coupler shaft 30 corresponding to the hole 14, and can be connected to the body 11 by screwing the coupler shaft 30 into the hole 14. Another variation is to make a hole 14 on the end stopper 20' and a coupler shaft 30 on the cord stop component 10'.

In the cord holding buckle 3 of FIG. 9, the cord holding component 15 is different from the other embodiments. This cord holding component 15 was developed by the present applicant before (Japanese Patent Application No. 10-364345), and is composed of a body 16 and a locking member 17 rotatably attached to the body 16. When the locking member 17 is rotated toward the outside at the top fixed point, this position is the cord free position and the extending part 41a of the cord 41 can be inserted into a through-hole 16a of the body 16. When the locking member 17 is rotated toward the body 16, the extending part 41a is stopped by a teeth biting mechanism between a cord receiving face of the through-hole 16a and an end face of the locking member 17. A belt-like part 42 is exclusively used for attaching the cord holding component 15 to clothing 40, etc. The cord holding component of the present invention may have the structure described here, different from the first and second embodiments.

The cord holding buckle 3 of FIG. 9 has a structure for connecting the end stopper 20" with the body 16 of the cord holding component 15 different from the previous embodiments. The body 16 integrally has a reverse T-like rail part 18 on its bottom side. The end stopper 20" has a rail groove 31 matching the rail part 18 and is connected to the body 16 by the connection of the rail part 18 and the rail groove 31. Another variation is to make a rail part 18 on the end stopper 20" and a rail groove 31 on the cord holding component 15. The method of connecting the cord holding component 10 or 15 and the end stopper 20" can be properly selected from the known connection structures.

As described above, with the cord holding buckle for connecting an end stopper to a cord holding component through female and male couplers of the present invention, in case a cord extending part drawn out of the cord holding component is long, the cord extending part drawn out of the cord holding component stays in a loop between the cord holding component and the end stopper. Consequently, the looped length of the cord extending part is shortened to the half length and the swinging of the cord extending part and end stopper is effectively suppressed by this invention. Therefore, the present invention can certainly eliminate the troubles of a conventional cord extending part and end stopper, which makes a user uneasy, becomes cumbersome, and hit a user's face, and can also improve the outer appearance of the cord holding device.

While the invention has been explained with reference to the specific embodiments of the invention, the explanation is illustrative and the invention is limited only by the appended claims.

What is claimed is:

1. A cord holding buckle, comprising:
   a cord holding device including a body portion, a through-hole formed in the body portion for allowing a cord to pass therethrough, a fixing member for fixing the cord relative to the body portion, and a first coupler attached to the body portion, and
   an end stopper to be attached to an end of the cord extending from the cord holding device, and having at least one second coupler detachably attached to the first coupler so that the end stopper can be detachably attached to the cord holding device, said end stopper being formed of first and second snap members with a hinge portion therebetween to be folded at the hinge portion, and first and second engaging members attached to the first and second snap members, said first and second engaging members engaging together while receiving the end of the cord between the first and second snap members so that the first and second snap members become one piece as a joined snap body.

2. A cord holding buckle according to claim 1, wherein said second coupler is formed on each side of the end stopper so that one of the second couplers joins the first coupler of the cord holding device.

3. A cord holding buckle according to claim 1, wherein said first coupler is formed of one of an engaging projection and an engaging recess for receiving the engaging projection therein, and said second coupler is formed of the other of the engaging projection and the engaging recess.

4. A cord holding buckle according to claim 3, wherein each of the first and second snap members includes a plurality of projections projecting inwardly when the first and second snap members are assembled together so that the cord is held between the first and second snap members with the projections.

5. A cord holding buckle according to claim 1, wherein said first coupler is formed of one of an engaging projection with a male thread and an engaging recess with a female thread engaging the male thread, and said second coupler is formed of the other of the engaging projection and the engaging recess.

6. A cord holding buckle according to claim 1, wherein said first coupler is formed of one of a rail shape projection and a rail shape groove engaging the rail shape projection, and said second coupler is formed of the other of the rail shape projection and the rail shape groove.

* * * * *